(12) United States Patent
Liu et al.

(10) Patent No.: US 12,058,399 B2
(45) Date of Patent: *Aug. 6, 2024

(54) METHODS AND APPARATUS FOR MULTI-TELEVISION MEASUREMENTS

(71) Applicant: TVision Insights, Inc., Cambridge, MA (US)

(72) Inventors: Yanfeng Liu, Astoria, NY (US); Inderbir Sidhu, Lexington, MA (US); Sara Radkiewicz, Somerville, MA (US); Daniel Schiffman, New York, NY (US); Wei Dai, Woburn, MA (US); Joseph Crabtree, Collingswood, NJ (US)

(73) Assignee: TVision Insights, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,431

(22) Filed: Aug. 24, 2023

(65) Prior Publication Data
US 2023/0403422 A1    Dec. 14, 2023

Related U.S. Application Data

(63) Continuation of application No. 16/606,343, filed as application No. PCT/US2018/028513 on Apr. 20, 2018, now Pat. No. 11,770,574.
(Continued)

(51) Int. Cl.
*H04N 21/422*    (2011.01)
*G01S 1/08*    (2006.01)
(Continued)

(52) U.S. Cl.
CPC ......... *H04N 21/42201* (2013.01); *G01S 1/08* (2013.01); *H04H 60/45* (2013.01);
(Continued)

(58) Field of Classification Search
None
See application file for complete search history.

(56) References Cited

U.S. PATENT DOCUMENTS 7,203,338 B2    4/2007    Ramaswamy et al.
7,260,837 B2    8/2007    Abraham et al.
(Continued)

FOREIGN PATENT DOCUMENTS

| JP | 2007/181070 A | 7/2007 |
| JP | 2014/086955 A | 5/2014 |
| JP | 2015/198428 A | 11/2015 |

*Primary Examiner* — An Son Huyhn
(74) *Attorney, Agent, or Firm* — Dilworth & Barrese, LLP; Barbara B. Courtney, Esq.

(57) ABSTRACT

Conventional television audience measurements are made with diaries or by imaging the area in front of a television and trying to identify the people in the images watching television. Unfortunately, diaries are only accurate if the audience members record entries in them, and image-based techniques are intrusive. The present techniques address these problems by using a viewer's wearable device to measure a viewer's proximity to a television. The wearable device emits or receives low-power beacon signals; measurements of the signal strength are used to calculate the viewer's distance to the television. If the viewer is close enough to the television and the television is on, the viewer may be engaged with the content on the television. This system is simple, non-intrusive, and can used to measure engagement with each television in a multi-television household.

5 Claims, 6 Drawing Sheets

Related U.S. Application Data (60) Provisional application No. 62/487,710, filed on Apr. 20, 2017.

(51) Int. Cl.
*H04H 60/45* (2008.01)
*H04H 60/46* (2008.01)
*H04H 60/52* (2008.01)
*H04N 21/442* (2011.01)

(52) U.S. Cl.
CPC ............ *H04H 60/46* (2013.01); *H04H 60/52* (2013.01); *H04N 21/44218* (2013.01)

(56) References Cited

U.S. PATENT DOCUMENTS

| | | | |
|---|---|---|---|
| 7,609,853 B2 | 10/2009 | Ramaswamy et al. | |
| 8,235,725 B1 | 8/2012 | Hill | |
| 8,456,293 B1* | 6/2013 | Trundle | G08B 3/00 705/14.1 |
| 8,554,214 B2* | 10/2013 | Sweeney | H04W 8/005 455/414.1 |
| 8,561,095 B2 | 10/2013 | Dimitrova et al. | |
| 8,607,295 B2* | 12/2013 | Bhatia | H04N 21/6334 725/141 |
| 8,667,520 B2* | 3/2014 | Bhatia | H04N 21/8545 725/12 |
| 8,863,196 B2* | 10/2014 | Patil | H04N 21/482 725/78 |
| 9,083,988 B1 | 7/2015 | Rowe | |
| 9,137,558 B2* | 9/2015 | Gibbon | H04H 60/43 |
| 9,146,990 B2* | 9/2015 | Scherf | G06F 16/951 |
| 9,161,066 B1* | 10/2015 | Oztaskent | H04N 21/24 |
| 9,218,122 B2* | 12/2015 | Thomas | G06F 9/4451 |
| 9,224,048 B2 | 12/2015 | Deng | |
| 9,288,387 B1* | 3/2016 | Keller | H04W 8/183 |
| 9,368,105 B1* | 6/2016 | Freed | G10L 15/22 |
| 9,531,998 B1* | 12/2016 | Farrell | H04N 7/141 |
| 9,544,650 B1* | 1/2017 | Oztaskent | G06F 16/438 |
| 9,554,061 B1* | 1/2017 | Proctor, Jr. | H04S 7/00 |
| 9,667,584 B2* | 5/2017 | Archibong | H04W 4/80 |
| 9,838,755 B1* | 12/2017 | Kodige | H04N 21/64322 |
| 9,980,002 B2* | 5/2018 | Yan | H04N 21/4882 |
| 10,187,694 B2* | 1/2019 | Meredith | H04H 60/66 |
| 10,205,988 B1* | 2/2019 | Waterman | H04N 21/8455 |
| 10,356,142 B1* | 7/2019 | Rajagopalan | H04L 65/611 |
| 10,587,921 B2* | 3/2020 | Cho | H04N 21/44204 |
| 10,631,029 B1* | 4/2020 | Nijim | H04N 21/251 |
| 10,841,651 B1* | 11/2020 | Karnezos | H04L 67/02 |
| 10,885,092 B2* | 1/2021 | Cruz Huertas | G06N 5/02 |
| 10,904,617 B1* | 1/2021 | Labarre | H04N 21/233 |
| 2002/0026635 A1* | 2/2002 | Wheeler | H04N 21/235 725/19 |
| 2003/0093784 A1 | 5/2003 | Dimitrova et al. | |
| 2005/0038749 A1 | 2/2005 | Fitch et al. | |
| 2005/0289582 A1* | 12/2005 | Tavares | H04N 21/25891 725/10 |
| 2006/0259923 A1 | 11/2006 | Chiu | |
| 2007/0078552 A1* | 4/2007 | Rosenberg | H04W 52/0254 700/94 |
| 2007/0233759 A1* | 10/2007 | Tomlinson | G06F 16/40 708/200 |
| 2007/0271580 A1 | 11/2007 | Tischer et al. | |
| 2008/0097749 A1 | 4/2008 | Xie et al. | |
| 2009/0030780 A1 | 1/2009 | York et al. | |
| 2009/0061841 A1* | 3/2009 | Chaudhri | H04L 65/1059 455/420 |
| 2009/0111463 A1* | 4/2009 | Simms | H04W 16/14 455/424 |
| 2009/0138805 A1* | 5/2009 | Hildreth | H04N 21/4755 715/745 |
| 2009/0160731 A1* | 6/2009 | Schuler | G06F 3/1423 345/1.1 |
| 2010/0107184 A1 | 4/2010 | Shintani | |
| 2010/0211439 A1* | 8/2010 | Marci | H04N 21/4662 705/7.29 |
| 2011/0069940 A1* | 3/2011 | Shimy | H04N 21/4532 386/296 |
| 2011/0163939 A1* | 7/2011 | Tam | G06F 3/1454 345/2.3 |
| 2012/0011550 A1* | 1/2012 | Holland | H04N 21/43079 725/78 |
| 2012/0245978 A1 | 9/2012 | Jain et al. | |
| 2012/0315014 A1* | 12/2012 | Shuster | G06F 16/78 386/E9.011 |
| 2013/0027613 A1* | 1/2013 | Kim | H04N 21/4316 348/563 |
| 2013/0036200 A1* | 2/2013 | Roberts | H04L 65/1093 709/219 |
| 2013/0061257 A1 | 3/2013 | Takaya et al. | |
| 2013/0093897 A1* | 4/2013 | Fan | H04N 23/80 348/E7.085 |
| 2013/0094538 A1* | 4/2013 | Wang | H04L 63/08 375/141 |
| 2013/0117692 A1* | 5/2013 | Padmanabhan | G06V 40/172 715/753 |
| 2013/0145403 A1* | 6/2013 | Sofos | H04N 21/4122 725/62 |
| 2013/0167168 A1* | 6/2013 | Ellis | H04N 21/458 725/12 |
| 2013/0173765 A1* | 7/2013 | Korbecki | H04N 21/42209 709/221 |
| 2013/0205314 A1* | 8/2013 | Ramaswamy | H04H 60/33 725/14 |
| 2013/0268955 A1* | 10/2013 | Conrad | H04N 21/8549 725/12 |
| 2013/0298146 A1* | 11/2013 | Conrad | H04N 21/44218 725/35 |
| 2013/0339433 A1 | 12/2013 | Li et al. | |
| 2013/0346564 A1* | 12/2013 | Warrick | H04L 12/1886 709/219 |
| 2013/0346867 A1* | 12/2013 | Woods | G11B 27/34 715/728 |
| 2014/0002749 A1* | 1/2014 | Pora | H04N 21/4394 348/725 |
| 2014/0026158 A1* | 1/2014 | Rowe | H04N 21/42218 725/18 |
| 2014/0068692 A1* | 3/2014 | Archibong | H04N 21/6334 725/116 |
| 2014/0130087 A1* | 5/2014 | Cho | H04N 21/4394 725/34 |
| 2014/0168344 A1* | 6/2014 | Shoemake | H04N 7/147 348/14.01 |
| 2014/0245335 A1* | 8/2014 | Holden | H04N 21/4223 725/12 |
| 2014/0282665 A1* | 9/2014 | Arini | H04N 21/41407 725/18 |
| 2014/0282684 A1* | 9/2014 | Keen | H04N 7/18 725/30 |
| 2014/0359647 A1* | 12/2014 | Shoemake | H04N 21/6582 725/10 |
| 2014/0363059 A1* | 12/2014 | Hurewitz | G06Q 30/0201 382/118 |
| 2015/0067708 A1* | 3/2015 | Jensen | H04N 21/44218 725/10 |
| 2015/0070516 A1* | 3/2015 | Shoemake | H04N 21/4542 348/207.11 |
| 2015/0110471 A1* | 4/2015 | Zheng | G06F 3/005 386/291 |
| 2015/0150031 A1* | 5/2015 | Gibbon | H04N 21/4223 725/12 |
| 2015/0286716 A1* | 10/2015 | Snibbe | G06F 16/48 707/610 |
| 2015/0365722 A1* | 12/2015 | Oztaskent | G06F 16/433 725/18 |
| 2016/0021412 A1* | 1/2016 | Zito, Jr. | G06Q 30/02 725/13 |
| 2016/0050457 A1* | 2/2016 | Mondal | H04N 21/44204 725/18 |

(56) References Cited

U.S. PATENT DOCUMENTS

| | | | | |
|---|---|---|---|---|
| 2016/0165409 | A1* | 6/2016 | Bulut | H04W 4/06 |
| | | | | 715/734 |
| 2016/0182955 | A1* | 6/2016 | Klappert | H04N 21/44204 |
| | | | | 725/14 |
| 2016/0344873 | A1* | 11/2016 | Jenzeh | H04M 15/765 |
| 2016/0345062 | A1* | 11/2016 | Klappert | H04L 67/306 |
| 2016/0366203 | A1* | 12/2016 | Blong | H04L 65/612 |
| 2017/0055118 | A1* | 2/2017 | Ciecko | H04W 4/21 |
| 2017/0091850 | A1* | 3/2017 | Alvarez | H04W 4/029 |
| 2017/0134803 | A1* | 5/2017 | Shaw | H04N 21/234363 |
| 2017/0149795 | A1* | 5/2017 | Day | H04W 4/02 |
| 2017/0150213 | A1* | 5/2017 | Cremer | H04N 21/458 |
| 2017/0185276 | A1* | 6/2017 | Lee | G06F 3/04847 |
| 2017/0264920 | A1* | 9/2017 | Mickelsen | G06V 40/174 |
| 2017/0270560 | A1* | 9/2017 | Duggal | H04N 21/812 |
| 2017/0280394 | A1* | 9/2017 | Kim | H04M 1/73 |
| 2017/0289807 | A1* | 10/2017 | Mendonca | G06F 21/629 |
| 2018/0020963 | A1* | 1/2018 | Friant | A61B 5/6801 |
| | | | | 705/14.66 |
| 2018/0040324 | A1* | 2/2018 | Wilberding | G10L 17/22 |
| 2018/0063263 | A1* | 3/2018 | Bandela | H04N 21/44224 |
| 2018/0098122 | A1* | 4/2018 | Cho | H04N 21/44204 |
| 2018/0098133 | A1* | 4/2018 | Liassides | H04N 21/44204 |
| 2018/0146231 | A1* | 5/2018 | Saeedasr | H04N 21/43615 |
| 2018/0183874 | A1* | 6/2018 | Cook | H04L 41/145 |
| 2018/0192144 | A1* | 7/2018 | McElroy | H04L 65/613 |
| 2018/0233145 | A1* | 8/2018 | Bathiche | H04N 21/44222 |
| 2018/0310042 | A1* | 10/2018 | Mayalil | H04N 21/41407 |
| 2018/0343324 | A1* | 11/2018 | Zhu | H04L 69/18 |
| 2018/0376205 | A1* | 12/2018 | Oswal | G06T 19/006 |
| 2019/0179846 | A1* | 6/2019 | Taboriskiy | G06F 16/48 |
| 2020/0169787 | A1* | 5/2020 | Pearce | H04N 21/8405 |
| 2020/0396517 | A1* | 12/2020 | Hodge | H04N 21/4223 |

* cited by examiner

METHODS AND APPARATUS FOR MULTI-TELEVISION MEASUREMENTS

CROSS-REFERENCE TO RELATED APPLICATION(S)

This application is a continuation of U.S. patent application Ser. No. 16/606,343, which is a U.S. National Application Filed Under 35 U.S.C. 371 of International Application No. PCT/US2018/028513, filed Apr. 20, 2018, which claims priority benefit, under 35 U.S.C. 119(e), of U.S. Application No. 62/487,710, which was filed on Apr. 20, 2017.

All of the above references documents are incorporated herein by reference in their entirety.

BACKGROUND

Conventional methods of television audience measurements include using people meters and diaries, including electronic diaries, to collect data from the audience. These active methods typically involve have a viewer make an entry into a diary or actuating a button or switch whenever the viewer watches television. Unfortunately, these techniques fail if the viewer doesn't record entries properly, which is often the case.

Other techniques involve acquiring image data of the area in front of a television and trying to identify the people watching television in the images. Although these passive methods are more likely to produce reliable and complete results than active methods, acquiring images of the television viewing area is often too invasive for televisions in more private locations, such as bedrooms or rooms where children may watch. Storing and analyzing image data also raises concerns about privacy, especially if the images are transmitted or stored by potentially vulnerable computer networks.

SUMMARY

The current technology addresses problems with active television audience measurement techniques and passive, image-based television audience measurement techniques. It is also simple, non-invasive, and inexpensive enough to deploy throughout an entire residence instead of in just one or two prime locations within a residence. This makes it possible to assess viewer presence and/or engagement with each television in the residence instead of being limited to assessing viewer presence and/or engagement with just a single television in the residence.

As disclosed in greater detail below, a viewer's smartphone, wearable, or other personal device talks to a computing device, which may take the form of a USB or HDMI compute stick hooked up to the television, and to a WiFi router. (The computing device may also plug into a power outlet near the television instead of directly into the television.) The viewer's personal device emits or receives a low-power beacon signal (e.g., a Bluetooth Low Energy beacon). The personal device or compute stick measures the distance to the viewer's personal device based on the received beacon signal strength or forwards the received beacon signal strength measurements to a server that calculates the distance.

If the distance is short enough (e.g., <10 ft.), a processor in the compute stick may determine that the viewer is in the room with the television. And if multiple devices measure the received beacon signal strength simultaneously, the personal device, compute stick, or server can triangulate to estimate the viewer's location with respect to the television as opposed to just estimating the distance between the viewer and the television. The compute stick also samples the audio signal emitted by the television to determine if the television is on and, if so, which program is playing. If the television is on while the viewer is in the room (e.g., for a long enough period, such as one minute or more), the compute stick determines that the viewer is engaged with the television.

If the viewer's personal device is a wearable device, that wearable device may also measure the wearer's heartbeat and relay the heartbeat information to the compute stick. The compute stick may use the heartbeat as a proxy for the viewer's engagement with the television. For instance, a faster heartbeat may indicate that the viewer is excited by and more fully engaged with the program on the television, whereas as a slower, steadier heartbeat may indicate that the viewer is less engaged with or not watching the program on the television.

In some cases, the viewer's personal device includes an accelerometer, gyroscope, inertial measurement unit, or other device that senses position, attitude, acceleration, velocity, and/or other movement data. In these cases, the compute stick may collect movement (e.g., acceleration) data from the personal device when the personal device is within range of the compute stick. Alternatively, or in addition, the personal device may transmit this movement information directly to the server via the internet. The compute stick and/or server may process this movement information to estimate (1) whether or not the viewer is wearing or holding the personal device and, if so, (2) whether the viewer's motion indicates that the viewer is watching the television. For instance, if the motion information indicates that the personal device is perfectly still, the compute stick/server may determine that the viewer is not wearing or holding the personal device and hence that the viewer may not actually be watching television. Similarly, if the motion information indicates that the personal device is moving rapidly, the viewer may not be watching television. And if the motion information indicates that the viewer is moving gently (e.g., shifting side-to-side, breathing, etc.), the compute stick/processor may determine that the viewer is watching the television.

The compute stick stores information about the viewer's proximity to the television and what, if anything, is playing on the television. It transmits this information to a server via the WiFi router. The server performs additional processing on the transmitted data, including triangulating the viewer's location based on received signal strength indication (RSSI)/distance measurements of a single personal device from many compute sticks and/or Bluetooth beacons. The server may also apply information about walls and other obstacles to refine the estimate of the viewer's location relative to the television.

The system is completely passive—it doesn't need viewers to do anything other than keep their personal devices charged and with them—so it doesn't suffer from many of the drawbacks associated with active systems. And because it doesn't collect image data, it can be used in bedrooms and other areas where privacy is a concern. The compute stick is also small and simple enough to be deployed with every television in a house. Using a personal device for passive data collection also increases the measurement compliance rate, making data collection more reliable and potentially less expensive by reducing the number of households needed to collect a statistically significant sample and by reducing the viewer compensation per household and the total viewer compensation for a survey.

An example method of sensing viewer proximity to a display playing a video is as follows and includes receiving at least one beacon signal transmitted between a computing device and a personal device carried or worn by a viewer while the video is playing on the display. The computing device can receive the beacon signal from the personal device. Alternatively, or in addition, the personal device may receive a first beacon signal from the computing device and, optionally, a second beacon signal from a beacon. The computing device acquires samples of an audio signal (e.g., at a sampling rate of 0.1 Hz) associated with the video playing on the display and determines that the display is playing the video based on the samples of the audio signal. The computing device or another processor (e.g., a server communicatively coupled to the computing device) estimates, based on the at least one beacon signal, a proximity of the viewer to the display while the display is playing the video. For instance, the computing device may estimate the proximity of the viewer to the display based on a received signal strength indication of the beacon signal.

Such a method may also include storing, in a memory of the computing device, an indication of the beacon signal and the samples of the audio signal. The computing device can transmit the indication of the beacon signal the samples of the audio signal to a server that estimates the proximity of the viewer to the display. The computing device or the server can identify the video based on the samples of the audio signal and may assess engagement of the viewer with the video playing on the display based on the proximity of the viewer to the display.

This method may include measuring, with the personal device, a heartbeat of the viewer and/or movement of the personal device. This heartbeat and/or motion information can be used to assessing engagement of the viewer with the video playing on the display.

Such a method may also include communicating another beacon signal between the personal device and another computing device associated with another display while another video is playing on the other display. In these cases, the other computing device or a server may estimate a proximity of the viewer to the other display based on the other beacon signal and assess engagement of the viewer with the other video playing on the other display based on the proximity of the viewer to the other display.

An example device for assessing engagement of a viewer with a video playing on a display includes an antenna, a memory, a network interface, and a processor that is operably coupled to the antenna, the memory, and the network interface. In operation, the antenna, which is disposed in proximity to the display, communicates at least one wireless beacon signal with a personal device carried or worn by the viewer. (The antenna can receive or transmit the wireless beacon signal from or to the personal device.) The processor estimates a proximity of the viewer to the display based on the wireless beacon signal, acquires samples of an audio signal associated with the video, and determines an identity of the video based on the samples of the audio signal. The memory stores representations of the proximity of the viewer to the display and the identity of the video. And the network interface transmits the representations to a server configured to assess the engagement of the viewer with the video playing on the display based on the proximity of the viewer to the display and the identity of the video.

Another embodiment includes a method of estimating engagement of a viewer with a display playing a video. This method includes receiving, by a wearable device worn by the viewer, a first wireless beacon signal broadcast by a computing device while the video is playing on the display. The wearable device also receives a second wireless beacon signal broadcast by a beacon while the video is playing on the display. The computing device acquires samples of an audio signal associated with the video playing on the display; these samples are used to determine that the display is playing the video. The computing device or a server estimates, based on the first beacon signal and the second beacon signal, a location of the viewer with respect to the display while the display is playing the video. Meanwhile, the wearable device measures a heartbeat of the viewer, movement of the wearable device, or both. The viewer's location, heartbeat, and/or wearable device movement are used to assess engagement of the viewer with the video playing on the display.

The wearable device may transmit measurements of the first beacon signal and the second beacon signal to a server.

If desired, the computing device may determine an identity of the video based on the samples of the audio signal and transmit the identity of the video to a server.

The wearable device can also receive a third beacon signal from another computing device associated with another display while another video is playing on the other display. This third beacon signal can be used to estimate a location of the viewer with respect to the other display. And this location information can be used to assess engagement of the viewer with the other video playing on the other display.

Another embodiment includes a system for assessing engagement with a viewer. This system includes a first display, a second display, a first computing device, a second computing device, a beacon, a personal device, and a server. In operation, the first display plays a first video, and the first computing device, which is operably coupled to the first display, transmits a first wireless beacon signal. Likewise, the second display plays a second video, and the second computing device, which is operably coupled to the second display, transmits a second wireless beacon signal. The beacon transmits a third wireless beacon signal. And the personal device, which can be worn or carried by the viewer, receives the first beacon signal, the second beacon signal, and/or the third beacon signal and measures a heart rate and/or motion of the viewer. The a server, which is communicatively coupled to the personal device, the first computing device, and the second computing device, assesses the engagement of the viewer with the first video and the second video based on the first beacon signal, the second beacon signal, and/or the third beacon signal and the heart rate and/or motion of the viewer.

In some cases, the first computing device is configured to acquire samples of a first audio signal associated with the first video and to determine an identity of the first video based on the samples of the first audio signal. Similarly, the second computing device can be configured to acquire samples of a second audio signal associated with the second video and to determine an identity of the second video based on the samples of the second audio signal.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Measuring Viewer Engagement Based on Beacons from Personal Devices

Figure 1A:
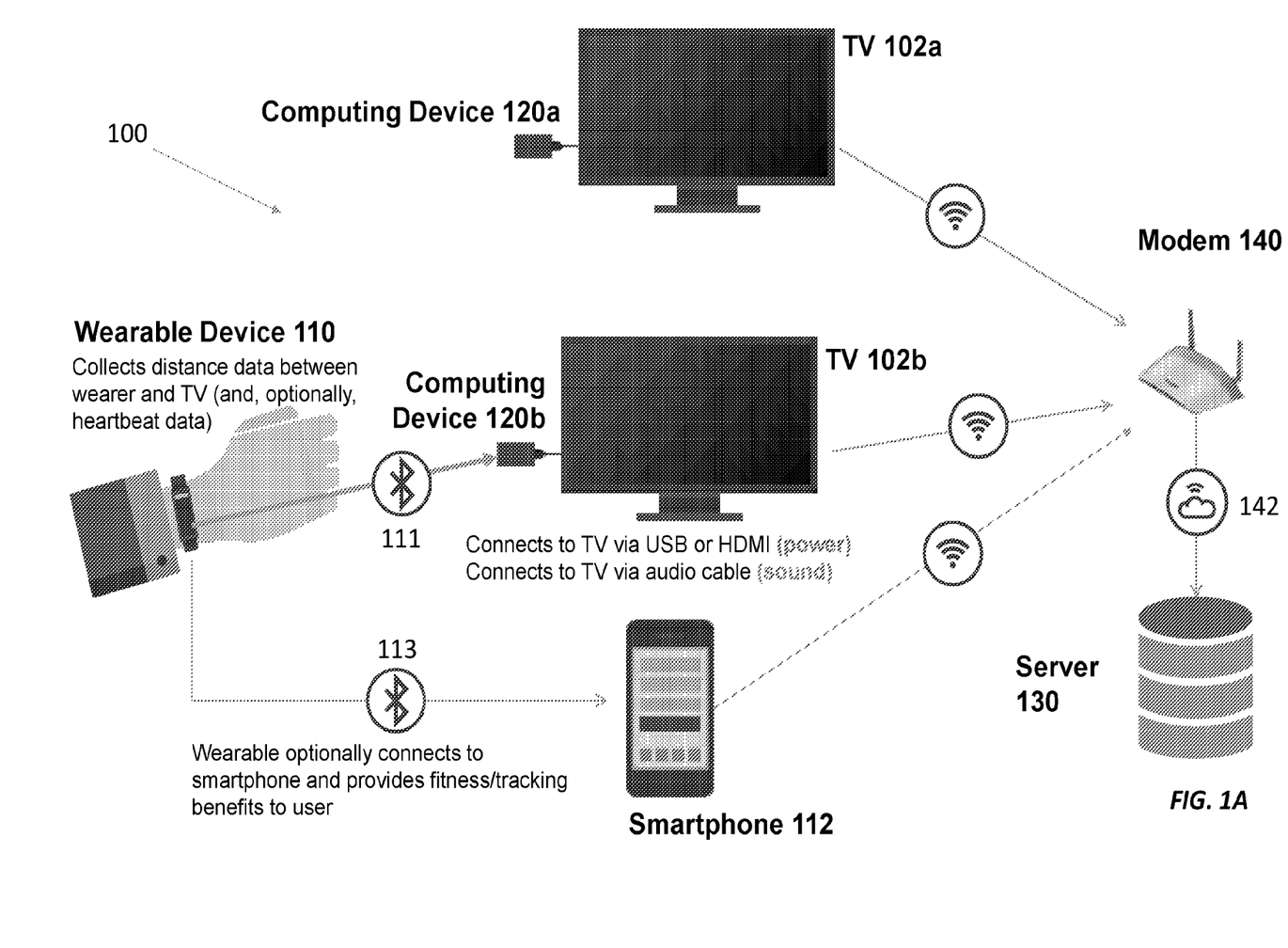
FIG. 1A shows a system that uses a wearable device to detect and report the presence or absence of a viewer in the vicinity of a television based on beacon signals emitted by the wearable device.

FIG. 1A illustrates a system 100 that uses a viewer's personal electronic device (e.g., a smartphone or wearable device, such as a fitness tracker or smart watch) to detect and report the presence or absence of a viewer in rooms with televisions (TVs) 102a and 102b (collectively, televisions 102). The system 100 includes three major components: a personal device, such as a wearable device 110 or smartphone 112, for each viewer in the household, a computing device 120a, 120b (collectively, computing devices, set-top devices, or dongles 120) for each television 102 in the household, and a server 130. The dongles 120 communicate with the server 130 via a WiFi modem 140 and an internet connection 142.

In operation, each wearable device 110 emits a beacon signal 111, such as Bluetooth Low Energy (BLE) advertisement packets or other suitable wireless signals, that uniquely identifies the wearable device 110. If the viewer has a smartphone 112 but not a wearable device 110, an app on the smartphone 112 may cause the smartphone 112 to emit the beacon signal 111. The wearable device 110 may also acquire and record physiological data about the wearer, including but not limited to the wearer's heart rate, temperature, and activity level. It may transmit some or all of this physiological data to the computing device 120.

If the wearable device 110 is within range of a given computing device 120, the computing device 120 detects the beacon signal 111 and posts the presence status to the server 130 via the WiFi modem 140. Each computing device 120 that detects the beacon signal 111 may store a representation of the received signal in a local memory. This representation may include the UUID associated with beacon signal 111, the RSSI of the beacon signal 111, and a timestamp indicating when the dongle 120 detected the beacon signal 111.

In some cases, the computing device 120 estimates the viewer's proximity to the corresponding TV based on the presence or absence of the beacon signal 111. That is, the computing device 120 may count a personal device as "present" regardless of its RSSI so long as it detects the beacon signal 111. In other examples, the computing device 120 monitors and filters the RSSI and detects the presence of the viewer based on an RSSI threshold with hysteresis. This RSSI threshold may be calibrated based on where the viewer sits with respect to the computing device 120, where the computing device 120 is plugged in, and the RF environment in which it is used.

The computing device 120 reports the viewer's proximity to the server 130 along with some or all of the other data stored in the local memory. For instance, the computing device 120 may report simply that the viewer (or more precisely, the viewer's wearable device 110 or smartphone 112) is within a predetermined radius of a given television 102 in the household at a particular time. Or the computing device 120 may transmit all of the information stored in the local memory to the server 130 for further processing. In these cases, the computing device 120 may provide the stored information to the server 130 with or without computing the viewer's proximity to the television 102 or determining whether or not the viewer is present. Instead, the server 130 may compute the viewer's proximity to the television 102 and determine whether or not the viewer is present. Whether or not the computing device 120 computes the viewer's proximity to the television 102 or determines whether or not the viewer is present, the server 130 can produce refined estimates of the viewer's proximity and presence based on updated or adjusted processes for calculating the viewer's location long after the beacon measurements are made.

The computing device 120 also samples the soundtrack of the video, either with an audio cable or a microphone (not shown). It uses these samples to determine if the television 102 is showing a video—if the sound is off, then the television 102 is probably off too or the viewer is not (completely) engaged with the video. If the television 102 is playing a video, the computing device 120 identifies the video by comparing the samples to a database or library of audio samples from candidate videos. The computing device 120 stores identifying information about the video and information about when the video was playing (e.g., timestamps of the videos start time, stop time, and/or duration). If desired, the computing device 120 continuously or continually overwrites the audio samples to conserve available memory and protect the viewer's privacy. The computing device 120 may also overwrite or erase the video identity information to conserve available memory and protect the viewer's privacy.

The computing devices 120 may transmit information about the proximity of viewers to the televisions 102 and the videos playing on the televisions 102 to the server 130 in real-time. They may also store this information locally and transmit stored data to the server 130 on a regular or semi-regular basis, e.g., in the early morning when upstream bandwidth is readily available. The server 130 processes and correlates the viewer proximity and viewer identity information for many households to assess which shows have the highest viewer engagement and how that engagement breaks down among different demographic groups, etc. The server 130 can serve a status page that displays which known wearable devices 110 are present in real time, as well as an event log with historical data about each wearer's location and viewing activities. If the server 130 receives proximity information for a single wearable device from more than one computing device 120, the server 130 may triangulate the wearable device's position for a more accurate estimate of the viewer's location.

Measuring Viewer Engagement Based on Beacons from Computing Devices

Figure 1B:
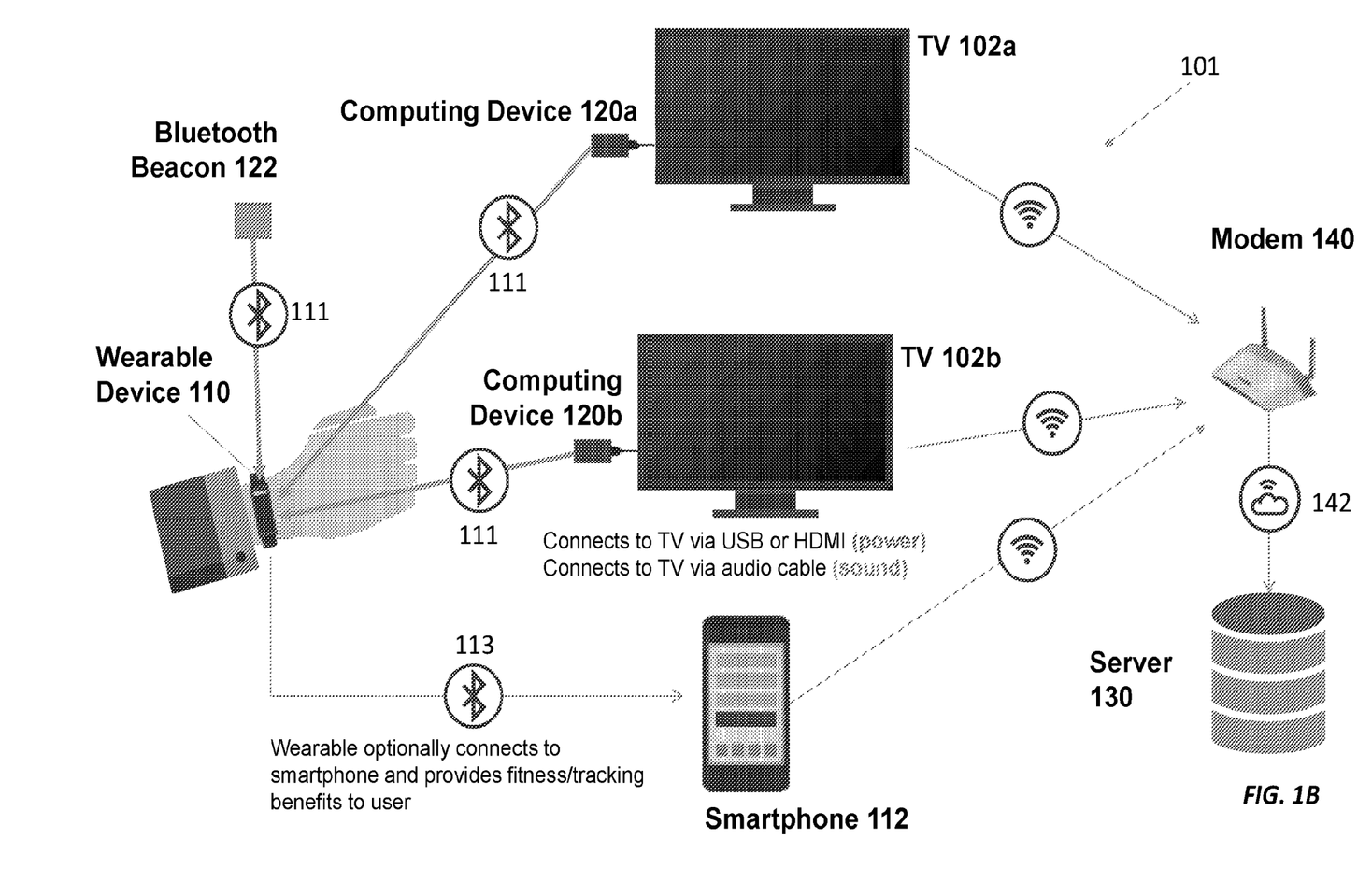
FIG. 1B shows a system that uses a wearable device to detect and report the presence or absence of a viewer in the vicinity of a television based on beacon signals received by the wearable device.

FIG. 1B shows an alternative system 101 that uses a viewer's personal electronic device (e.g., wearable device 110 or smartphone 112) to collect beacon signals from computing devices 120 and one or more beacons 122 for detecting and reporting the presence or absence of a viewer in rooms with televisions 102. The beacons 122 can be off-the-shelf Bluetooth beacons, such as the Naxa® Beacon Bluetooth® NA-4010 black tracking tag. They may be installed throughout the residence, including in rooms with televisions 102 and in spaces without televisions (e.g., centrally located crawl spaces).

In operation, the beacons 122 and, optionally, the computing devices 120 emit Bluetooth beacon signals 111 whose strengths decrease with distance and due to walls and other obstructions. The wearable device 110 (and/or smartphone 112) passively receives the beacon signals 111 from these beacons 122 and computing devices 120, and simply forwards them to the closest computing device 120 or the viewer's smartphone 112, either or both of which can compute the viewer's location based on the beacon signals received by the wearable device 110. For instance, the computing device 120 may triangulate based on the angles from which the wearable device 110 received the beacon signals 111 or may determine the distance to each computing device 120 and beacon 122 based on the RSSI, then trilaterate based on the distances. The computing device 120 and/or smartphone 112 can also forward this raw beacon signal data to the server 130, which in turn determines the viewer's location based on the beacon signals 111 received by wearable device 110. Alternatively, or in addition, the wearable device 110 can compute the viewer's location based on the received beacon signals 111.

Wearable Device

Figure 2A:
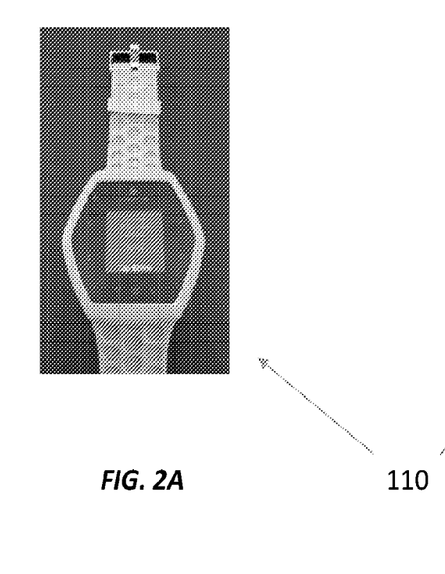
FIG. 2A is a photograph of a wearable device suitable for use with the systems shown in FIGS. 1A and 1B.
Figure 2B:
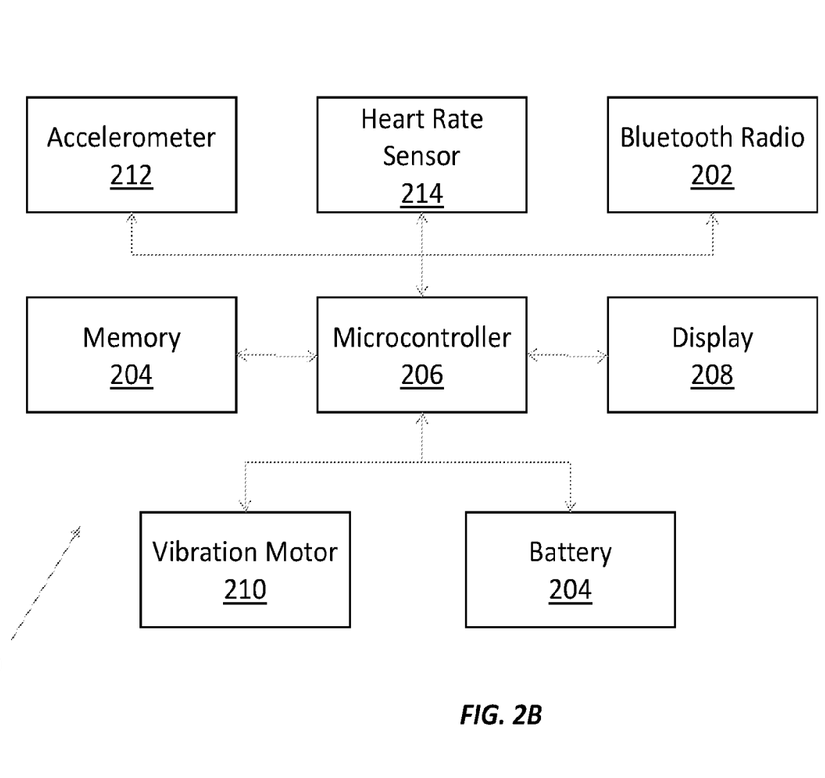
FIG. 2B is a block diagram of the wearable device shown in FIG. 2A.

FIGS. 2A and 2B illustrate an example of a wearable device 110 suitable for use in the system 100 of FIG. 1A. In this case, the wearable device 110 is a Hexiwear wearable development platform created by MikroElektronika for Bluetooth Low Energy (BLE) applications. The device 110 contains a Bluetooth radio 202, battery 204, microcontroller 206, organic light-emitting diode (OLED) display 208, vibration motor 210, and various sensors, including an accelerometer 212 that measures changes in the wearable device's motion and a heart rate sensor 214 that measures the viewer's heart rate. Its firmware is a slightly modified version of Hexi_BLE_Example developed using the MBED platform.

When used in the system 100 shown in FIG. 1A, the device 110 advertises its presence via the Bluetooth radio 202 using a standard BLE advertising packet used in the Hexiwear demonstration firmware, and unique devices can be identified by their media access controller (MAC) addresses. The device's Bluetooth radio 202 can also receive BLE advertising packets from beacons and computing devices, e.g., when used in the system 101 shown in FIG. 1B. To simulate the presence or absence of a wearable device, its advertising can be enabled or disabled using the bottom right cap touch button on the Hexiwear. When advertising is active, the light-emitting diode (LED) at the bottom-center of the Hexiwear is illuminated. To conserve the wearable device's battery 204, the OLED screen 208 power can be toggled using the bottom left cap touch button.

The wearable device 110 in FIGS. 2A and 2B uses both AltBeacon format and the Hexiwear standard advertising packet. A common issue with personal devices like the one shown in FIGS. 2A and 2B is that their physical locations can easily be tracked, causing security concerns for viewers. To alleviate this concern, the wearable 1device 110 may use a beacon protocol that requires a secondary resolution, e.g., Eddystone-EID, along with private resolvable addressing for obscuring the personal device's MAC address.

Those of skill in the art will appreciate that FIGS. 2A and 2B show just one or many possible implementations of suitable personal devices. For instance, the personal device may be implemented on the viewer's smartphone, smartwatch, fitness tracker, or other personal device as an Android or iOs app. If the app is loaded onto to more than one of the viewer's personal devices (e.g., a smartphone and a fitness tracker as shown in FIGS. 1A and 1B), the personal devices could act in concert to emit or receive the beacon signal, collect physiological data (e.g., heartbeats), etc. as shown in FIGS. 1A and 1B.

Computing Devices

Figure 3A:
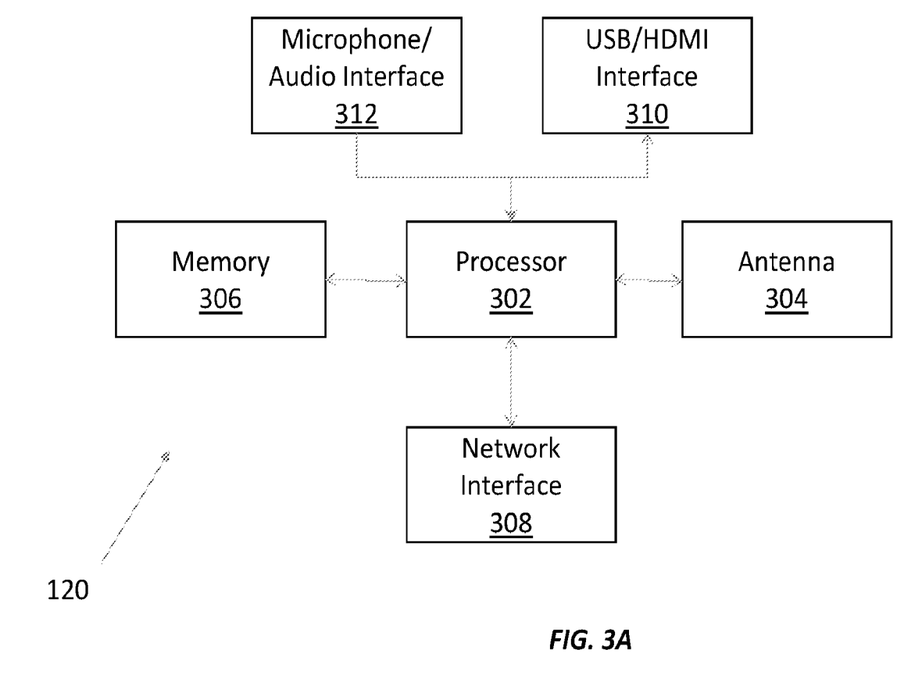
FIG. 3A is a block diagram of one of the computing devices shown in FIGS. 1A and 1B.

FIG. 3A shows one of the computing devices 120 from FIGS. 1A and 1B. It includes a processor 302, which is coupled to an antenna 304, a solid-state memory 306, and a network interface 308, such as a WiFi antenna or ethernet connection. The processor 302 can be any suitable microcontroller and controls operation of the computing device's other components. It may transmit and/or receive beacon signals and other signals via the antenna and estimate the viewer's proximity to the television based on the beacon signals. The memory 306 can stores raw beacon signal data, such as RSSIs and timestamps indicating when the beacon signals were detected, as well as estimates of the viewer's location with respect to the television. The processor 302 may transmit some or all of this information to the server 130 (FIGS. 1A and 1B) via the network interface 308.

The computing device 120 can be implemented as a dongle with a universal serial bus (USB) or high-definition multimedia interface (HDMI) interface 310 that plugs into a USB or HDMI port on a television 102. The computing device 120 can receive electrical power from the television 120 via either of these connections. The computing device 120 can also be implemented as a more conventional set-top box (STB) or set-top unit (STU) that receives power from a separate outlet and is not connected directly to a television 102.

Each computing device 120 includes may also include a microphone or audio interface 312 that connects with the corresponding television's audio jack and receives an audio output from the corresponding television. The computing device 120 uses the microphone or audio interface 312 to sample the audio signal, e.g., at a rate of 0.1 Hz to once every few minutes or hours (e.g., once every ten seconds, once every minute, once every ten minutes, once every half hour, once every hour, and so on), depending on the time of day, presence or absence of a user, whether the television is on or off, and/or the last sample. The computing device 120 may also sample the audio signal in response to receiving a Bluetooth beacon signal 111 from the wearable device 110 as in the system 100 of FIG. 1A or in response to receiving measurements of Bluetooth beacon signals 111 from the wearable device 110 as in the system 101 of FIG. 1B.

The computing device 120 may recognize whether or not a video is playing on the television 120 based on the samples and identify that video by comparing the samples to a database using audio fingerprinting. The computing device 120 stores the identity of the video and information about when the video played on the television (e.g., the timestamp of the program fingerprint matched using the audio samples, such as 13:00:23 EST; information about the program, such as program name and episode title; and the timestamp of when this information was recorded, such as 13:05:10 EST) and transmits this information to the server 130 via the network interface 308 for further processing.

In some cases, each computing device 120 provides a graphical user interface (GUI) viewable on the corresponding television 102 and accessible via the television's remote control. This GUI may display information about the status of the computing device 120 and of the wearable device(s) 110. It may also display some or all of the information stored in the computing device's local memory. And it may enable a user or viewer to configure the computing device, including its WiFi settings and memory settings, such as when and how frequently the computing device 120 sample audio data, transmits data to the server 130, checks for firmware updates from the server, etc.

Each computing device 120 can be implemented as an Intel Compute Stick with a preinstalled operating system, such as Android, Linux, or Microsoft Windows 10, which is compatible with the TVision AudioRecognizer application. To it is attached a receiver, such as a Silicon Labs BLED112 Bluetooth Dongle for BLE communication. This dongle is unique in that it contains a microcontroller running the entire Bluetooth stack and can communicate with the host system via a virtual serial port rather than the standard HCI interface, which requires native drivers. This makes it platform independent and facilitates rapid development. (BLED112 can be eliminated by using the internal Bluetooth in the Compute Stick and the Universal Windows Platform Bluetooth API, which is the preferred way of developing BLE applications for Windows 10. This can be done using C# and may be possible in C++ as well.)

The computing device 120 is controlled with a Python-based set-top application that scans for present devices using the PyGatt library and posts data to the server using the Requests library. Python 3 can be installed on the computing device 120 using Anaconda. This scanning and posting occurs with a period of 10 seconds, to allow sufficient time for beacon detection.

When booted, the computing device 120 automatically logs into Windows, starts the set-top application responsible for monitoring beacon signals and collecting audio samples, and opens the status page from the server in a full screen web browser window. In this way, the television 102 to which the computing device 120 is connected can be used to monitor the beacon status easily. The computing device 120 may also run TVision AudioRecognizer software, which identifies television shows based on the audio samples using audio fingerprinting techniques.

Those of skill in the art will readily appreciate that this is just one possible implementation of the computing device 120 and that other implementations are also possible. These other implementations may have different hardware and/or software configurations. For instance, they may use a different operating system, such as Android, Linux, or iOs. They may also perform more or less processing locally, depending on the overall system configuration.

Server

The server 130 can be implemented as a custom web application executed by a computer processor and written in Python and employing the Flask Microframework. The server provides an HTTP-based application programming interface (API) for querying a list of known beacon media access controller (MAC) addresses and universally unique identifiers (UUIDs) (in this case the two Hexiwear devices and two AltBeacon UUIDs) and posting their status (present or not present). It also serves an auto-refreshing status webpage that can be used to monitor beacon presence in real time. The web application is hosted and served on port 5000 on a DigitalOcean virtual private server running Ubuntu.

Figure 3B:
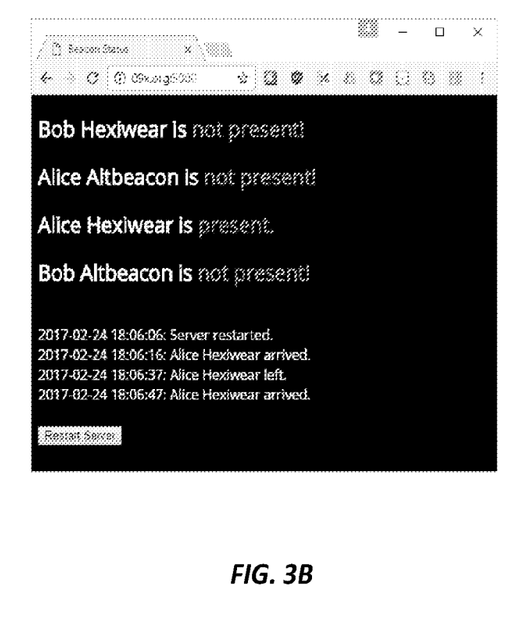
FIG. 3B is a screenshot of a server status page for the TVision server shown in FIGS. 1A and 1B.

For ease of access, this server uses the 09x.org domain owned by Emergent Devices, and the status page S (a screenshot of which appears in FIG. 3B) can be accessed at http://09x.org:5000. Any internet-connected device can be used to observe the server status page. Simply navigate to http://09x.org:5000 in a web browser. The device log can be cleared by clicking the 'Restart Server' button on the status page.

Those of skill in the art will readily appreciate that this is just one possible implementation of the server 130 and that other implementations are also possible. These other implementations may have different hardware and/or software configurations. For instance, they may use a different platform, including a different application server, different cloud vendor, or different operating system, such as Android, Linux, or iOs. They may also perform more or less processing locally, depending on the overall system configuration.

Computing Device Installation and System Operation

Figure 4:
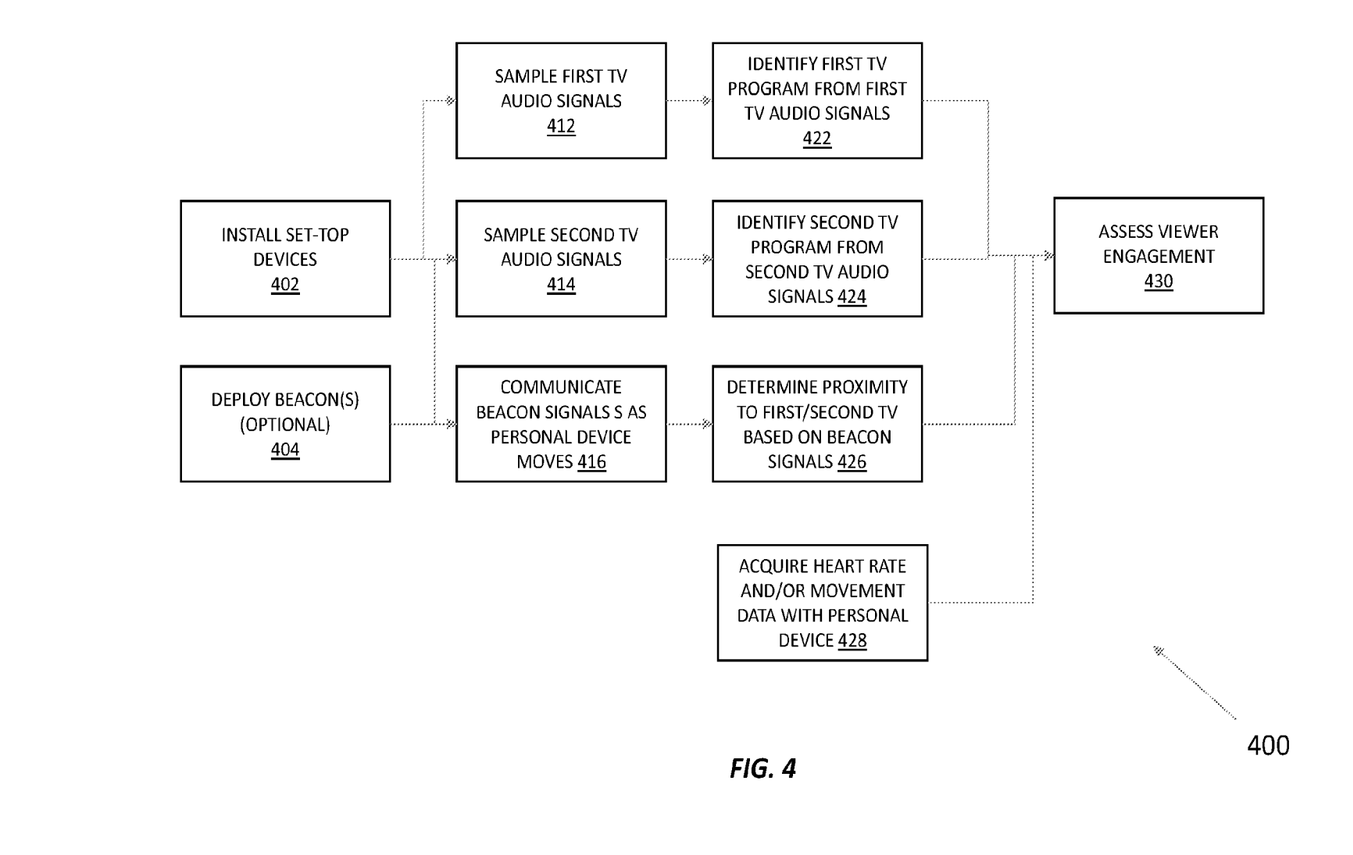
FIG. 4 illustrates a process for detecting and reporting the presence or absence of a viewer in the vicinity of a television based on beacon signals transmitted or received by the viewer's personal device.

FIG. 4 illustrates a process 400 for setting up and operating the systems shown in FIGS. 1A and 1B. The process starts with installation (402) of the computing devices, e.g., according to the following procedure:

Computing Device Installation

1. Ensure that the BLED112 and Sabrent dongles are installed in the computing device (compute stick). Plug the compute stick into an HDMI or USB port on the television.
2. Power on the television and change its input to the one corresponding to the compute stick.
3. Connect the compute stick power adapter to mains power. Observe that windows boots, the application starts, and a full screen browser window with the server status page opens.
4. One time only: when installed in a new location, the computing device will need to be connected to a Wi-Fi network to work properly. One way to do this is using the Intel Remote Keyboard app for Android or iOS. Configure Wi-Fi as with any Windows desktop, then restart the compute stick.

If desired, beacons may be deployed (404) through some or all of the residence where viewer engagement is being measured. Likewise, each wearable devices is charged, e.g., with a USB power source and tested, e.g., by toggling its beacon signal (advertisement) on and off. For the wearable device shown in FIG. 2A, the beacon signal is toggled using the bottom right cap touch button on the Hexiwear wearable device.

Once the computing devices and beacons have been installed and the wearable devices are ready, the system is ready to measure viewer engagement. The process 400 continues with communicating beacon signals (416) with personal devices that are worn or carried by the people in the household. As explained above, the personal devices may receive wireless beacon signals broadcast by the computing devices and beacons or the computing devices may receive wireless beacon signals broadcast by the personal devices. For example, If desired, a phone can be used to emit a beacon signal (e.g., AltBeacon, Beacon Simulator on Android) that the computing device can recognize (e.g., by creating AltBeacons with UUID 7b45207628d2472eb4c7969a4205d2f5 or 18139f032a45489bb59ab0dc0365b4a9 and toggling them on and off to simulate their presence). The received beacon signals are then used to estimate the personal device's proximity to one or more of the televisions in the residence (426). This estimation can be done locally, e.g., by one or the computing devices or personal devices, or by the system server.

At the same time, the computing devices sample the audio signals for the different televisions in the household (412, 414) and determine the identities of the programs playing on those televisions (422, 424). The personal device measures the viewer's heart rate and/or motion (428). The server, personal device, and/or computing device uses data about the program identities, heart rate, motion, and viewer proximity to the television(s) to assess the viewer's engagement with at least one of the shows playing on the television(s).

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03

The invention claimed is:

1. A method of estimating engagement of a viewer with a particular program playing on a display device, the method comprising:
   receiving, by a viewer device comprising one or more of a wearable device worn by the viewer and a mobile phone associated with the viewer, a first wireless beacon signal broadcast by a computing device while the program is playing on the display device, wherein the computing device is embodied in a compute stick and communicates with the display device via a means selected from a group comprising, a WiFi connection and a USB port;
   receiving, by the viewer device, a second wireless beacon signal broadcast by a beacon while the program is playing on the display device;
   acquiring, by the computing device, samples of an audio signal associated with the program playing on the display;
   determining an identity of the program based on the samples of the audio signal;
   estimating, based on the first beacon signal and the second beacon signal, a location of the viewer with respect to the display while the display is playing the program;
   measuring, with the wearable device, at least one of a heartbeat of the viewer or movement of the wearable device;
   assessing engagement of the viewer with the program playing on the display based on the location of the viewer with respect to the display and the at least one of the heartbeat of the viewer or the movement of the viewer device wherein the display device is one of multiple display devices within a residence, the viewer is one of multiple viewers within in the residence, the second wireless beacon signal is one of multiple second wireless beacon signals, and wherein each viewer is identifiable by the computing device;
   providing by a server a status page of the server that can be accessed by an internet-connected device, wherein the status page shows a log that records the presence or absence of multiple viewers and times when the multiple users arrived or left, and wherein the log can be cleared by restarting the server from the status page, wherein the log is maintained by the system and is not maintained or regulated by a social media platform or any other online entity that is accessible to anyone not participating in the system;
   receiving, by the viewer device, a third beacon signal from another computing device associated with another display device while another program is playing on the other display device;
   estimating a location of the viewer with respect to the other display device based on the third beacon signal; and
   assessing engagement of the viewer with the other program playing on the other display device based on the location of the viewer with respect to the other display device.

2. The method of claim 1, further comprising:
   transmitting measurements of the first beacon signal and the second beacon signal from the viewer device to the server, wherein the server is remote from the residence, and wherein the computing device communicates with the server via a network interface.

3. The method of claim 2, wherein determining an identity of the program based on the samples of the audio signal comprises generating audio fingerprints and comparing the fingerprints to information in a database.

4. The method of claim 3, further comprising:
   storing the audio fingerprints, the identity of the program, the location of the viewer, and an identity of the viewer in a memory of the computing device; and transmitting the audio fingerprints, the identity of the program, the location of the viewer, and the identity of the viewer to the server under predetermined circumstances.

5. The method of claim 4, further comprising generating and storing a timestamp that indicates when the location of the viewer and the audio samples were collected.

* * * * *